United States Patent
Michaelides et al.

(10) Patent No.: US 11,757,316 B2
(45) Date of Patent: Sep. 12, 2023

(54) ELECTRICAL MACHINE

(71) Applicant: Jaguar Land Rover Limited, Coventry (GB)

(72) Inventors: Alexandros Michaelides, Conventry (GB); Istvan Kiraly, Conventry (GB); Jose Malumbres Ruiz, Conventry (GB); Bonyadi Roozbeh, Conventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/643,150

(22) Filed: Dec. 7, 2021

(65) Prior Publication Data

US 2022/0166274 A1 May 26, 2022

Related U.S. Application Data

(63) Continuation of application No. 16/312,450, filed as application No. PCT/EP2017/064702 on Jun. 15, 2017, now Pat. No. 11,223,250.

(30) Foreign Application Priority Data

Jun. 21, 2016 (GB) .................................. 1610827

(51) Int. Cl.
*H02K 1/27* (2022.01)
*H02K 1/276* (2022.01)
(Continued)

(52) U.S. Cl.
CPC ........... *H02K 1/2766* (2013.01); *H02K 1/278* (2013.01); *H02K 15/03* (2013.01); *H02K 21/16* (2013.01); *H02K 29/03* (2013.01)

(58) Field of Classification Search
CPC ...... H02K 1/2766; H02K 1/278; H02K 15/03; H02K 21/16; H02K 29/03; H02K 1/276
See application file for complete search history.

(56) References Cited

U.S. PATENT DOCUMENTS

| 6,555,940 B2 | 4/2003 | Naito et al. |
| 2003/0094875 A1 | 5/2003 | Sakuma et al. |

(Continued)

FOREIGN PATENT DOCUMENTS

| DE | 102010010434 A1 | 9/2011 |
| EP | 2600498 A1 | 6/2013 |

(Continued)

OTHER PUBLICATIONS

Great Britain Intellectual Property Office, Combines Search and Examination Report under Sections 17 and 18(3) Issued in Application No. GB1709538.1, dated Dec. 19, 2016, 7 pages.

(Continued)

*Primary Examiner* — Thomas Truong
(74) *Attorney, Agent, or Firm* — McCoy Russell LLP

(57) ABSTRACT

An electrical machine comprises a stator and a rotor having a plurality of poles. Each pole comprises a radial axis centrally through the pole. Each pole comprises a first slot configuration having a magnet located centrally within the slot with the radial axis passing through the magnet or the magnet being substantially perpendicular to the radial axis. Each pole comprises a second slot configuration having a pair of magnets located at spaced apart positions within the slot. The pair of magnets are located each side of the radial axis. The first slot configuration is located between the second slot configuration and an outer perimeter of the rotor.

14 Claims, 6 Drawing Sheets

(51) Int. Cl.
*H02K 1/278* (2022.01)
*H02K 15/03* (2006.01)
*H02K 21/16* (2006.01)
*H02K 29/03* (2006.01)

(56) References Cited

U.S. PATENT DOCUMENTS

| | | |
|---|---|---|
| 2006/0119203 A1 | 6/2006 | Brown et al. |
| 2007/0228862 A1 | 10/2007 | Welchko et al. |
| 2012/0139382 A1 | 6/2012 | Yamagishi et al. |
| 2012/0200186 A1 | 8/2012 | Sano et al. |
| 2013/0020889 A1 | 1/2013 | Yamamoto et al. |
| 2013/0119807 A1 | 5/2013 | Nakada |
| 2013/0169098 A1 | 7/2013 | Chamberlin et al. |
| 2013/0307363 A1* | 11/2013 | Sano ............... H02K 1/27 310/156.01 |
| 2017/0063187 A1* | 3/2017 | Hao ................ H02K 21/14 |

FOREIGN PATENT DOCUMENTS

| | | |
|---|---|---|
| JP | 2015226371 A | 12/2015 |
| WO | 2008150035 A1 | 12/2008 |
| WO | 2012014728 A1 | 2/2012 |
| WO | 2012104715 A1 | 8/2012 |
| WO | 2013145285 A1 | 10/2013 |
| WO | 2013161474 A1 | 10/2013 |
| WO | 2016024324 A1 | 2/2016 |

OTHER PUBLICATIONS

ISA European Patent Office, International Search Report Issued in Application No. PCT/EP2017/064702, dated Sep. 22, 2017, WIPO, 4 pages.

ISA European Patent Office, Written Opinion of the International Searching Authority Issued in Application No. PCT/EP2017/064702, dated Sep. 22, 2017, WIPO, 4 pages.

Great Britain Intellectual Property Office, Combines Search and Examination Report under Sections 17 and 18(3) Issued in Application No. GB1709538.1, dated Nov. 30, 2017, 9 pages.

* cited by examiner

ELECTRICAL MACHINE

CROSS REFERENCE TO RELATED APPLICATIONS

The present application is a continuation of U.S. Non-Provisional patent application Ser. No. 16/312,450, entitled "ELECTRICAL MACHINE", and filed on Dec. 21, 2018. U.S. Non-Provisional patent application Ser. No. 16/312,450 is a U.S. National Phase of International Application No. PCT/EP2017/064702, entitled ELECTRICAL MACHINE", and filed on Jun. 15, 2017. International Application No. PCT/EP2017/064702 claims priority to Great Britain Patent Application No. 1610827.6 filed on Jun. 21, 2016. The entire contents of each of the abovementioned applications are hereby incorporated by reference in their entirety for all purposes.

TECHNICAL FIELD

The present disclosure relates to an electrical machine. Aspects of the disclosure relate to an electrical machine and to a vehicle.

BACKGROUND AND SUMMARY

It is known to use an electrical machine to generate a traction force to propel a vehicle, such as an automobile. The electrical machine may be used alone, or in combination with an internal combustion engine (ICE) in a hybrid electric vehicle (HEV).

The electrical machine may be used as a motor to provide a traction force to propel the vehicle. The electrical machine may also be used as a generator to generate electrical energy during some periods of vehicle operation, such as during regenerative braking.

One type of electrical machine which is suited to use in a vehicle is a permanent magnet synchronous motor (PMSM). The rotor has a plurality of poles distributed around the rotor. Each pole comprises one or more permanent magnets embedded within the rotor. For high torque applications, such as vehicle propulsion, it is desirable to provide a high density of magnetic flux within the rotor.

One issue with an electrical machine, such as a PMSM, is that the distribution of magnetic flux is concentrated centrally within the pole. A more desirable distribution of flux across a pole is a sinusoidal distribution.

There have been some efforts to improve PMSMs. For example, it is known to provide flux barriers within the rotor. The flux barriers are typically air-filled slots. The flux barriers can help to shape the path of magnetic flux between the permanent magnets and the circumference of the rotor, and therefore to control distribution of flux within the air gap around the rotor. It is also known to provide multiple layers of permanent magnets at different depths within the rotor. PMSMs can suffer from issues such as torque ripples which can result in generation of noise and vibrations when the electrical machine is operating.

At least one embodiment of the disclosure seeks to provide an improved distribution of magnetic flux around the rotor.

Aspects of the present disclosure provide an electrical machine and a vehicle.

In one aspect of the disclosure for which protection is sought there is provided an electrical machine comprising:
a stator;
a rotor having a plurality of poles, wherein each of the poles comprises a radial axis
centrally through the pole, the pole comprising: at least one slot of a first configuration having a magnet located centrally within the slot with the radial axis passing through the magnet;
at least one slot of a second configuration having a pair of magnets located at spaced apart positions within the slot, the pair of magnets located each side of the radial axis;
and wherein the at least one slot of the first configuration is located between the at least one slot of the second configuration and an outer perimeter of the rotor.

The at least one slot of the first configuration may comprise a first slot portion which is normal to the radial axis, with the magnet located within the first slot portion. The magnet may be symmetrical about the radial axis.

The at least one slot of the first configuration may comprise: a second slot portion; and a third slot portion; wherein the second slot portion and the third slot portion are at opposite ends of the first slot portion, and the second slot portion and the third slot portion are at an acute angle to the radial axis.

Optionally, for at least one of the slots of the first configuration, the second slot portion and the third slot portion are separated from the first slot portion by a bridge.

Optionally, for at least one of the slots of the first configuration, the second slot portion and the third slot portion may be continuous with the first slot portion.

The at least one slot of the second configuration may comprise a fourth slot portion and a fifth slot portion which are each at an acute angle to the radial axis, and one of the pair of magnets may be located within the fourth slot portion and another of the pair of magnets is located within the fifth slot portion.

The magnet located within the fourth slot portion may be shorter than a length of the fourth slot portion.

The magnets located within the fourth slot portion and the fifth slot portion may be located nearer to the radial axis than to an outer perimeter of the rotor.

Each of the poles may comprise:
two slots slot of the first configuration, each with a magnet located centrally within the slot;
a single slot of the second configuration, with a pair of magnets located within the slot about the radial axis;
wherein the two slots of the first configuration are located between the single slot of the second configuration and an outer perimeter of the rotor.

The magnet in the at least one slot of the first configuration and the pair of magnets in the at least one slot of the second configuration may be of equal length.

The slot of the first configuration may be a generally U-shaped slot.

The slot of the second configuration may be a generally V-shaped slot.

In one embodiment, each of the poles may comprise two first slot configurations, an inner one of the first slot configurations comprising a first slot portion which is normal to the radial axis, with the magnet located within the first slot portion, a third slot portion and a fourth slot portion, wherein the third slot portion and the fourth slot portion are at opposite ends of the first slot portion, and the third slot portion and the fourth slot portion are at an acute angle to the radial axis, and wherein an outer one of the first slot configurations comprises a first slot portion but not a third slot portion or a fourth slot portion.

In one embodiment, the third and fourth slot portions of a (outermost in the case where multiple first slot configurations are present for each pole) first slot configuration are open to the outside of the rotor.

In one embodiment, the second slot configuration comprises a central slot portion through which the central axis of the pole passes.

An aspect of the disclosure for which protection is sought provides a motor vehicle comprising an electrical machine as described.

Within the scope of this application it is expressly intended that the various aspects, embodiments, examples and alternatives set out in the preceding paragraphs and in the following description and drawings, including the individual features thereof, may be taken independently or in any combination. That is, all embodiments and/or features of any embodiment can be combined in any way and/or combination, unless such features are incompatible.

For the avoidance of doubt, it is to be understood that features described with respect to one aspect of the disclosure may be included within any other aspect of the disclosure, alone or in appropriate combination with one or more other features.

BRIEF DESCRIPTION OF THE DRAWINGS

One or more embodiments of the disclosure will now be described, by way of example only, with reference to the accompanying figures in which.

DETAILED DESCRIPTION

Figure 1:
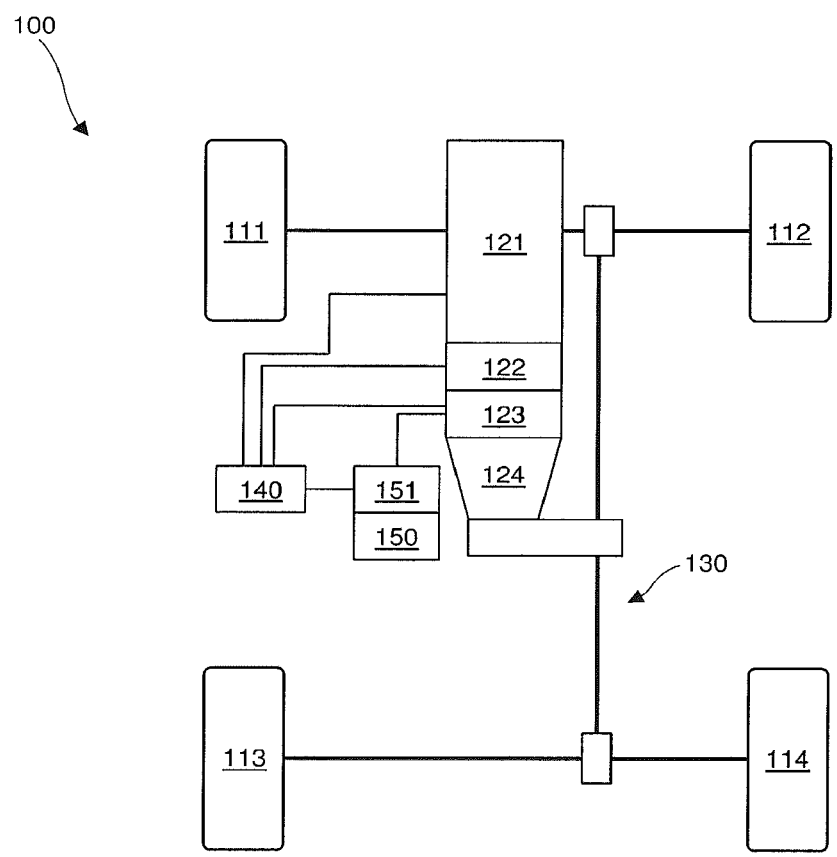
FIG. 1 schematically shows a vehicle with an electrical machine.

FIG. 1 shows one example of a vehicle in which an electrical machine according to an embodiment of the present disclosure may be used. The electrical machine may be used in an electric vehicle, or in a hybrid electric vehicle. FIG. 1 shows a hybrid electric vehicle (HEV) 100. The vehicle 100 has an internal combustion engine (ICE) 121 releasably coupled to a crankshaft integrated motor/generator (CIMG) 123 by means of a clutch 122. The CIMG 123 is coupled to a transmission 124, which is in turn coupled to the driveline 130 of the vehicle 100. The vehicle 100 is operable to provide drive torque to the transmission 124 by means of the engine 121 alone in an ICE mode, the CIMG 123 alone in an EV mode or the engine 121 and CIMG 123 in parallel in an HEV mode.

The transmission 124 may be a manual transmission, a paddle-shift operated semi-automatic transmission, an automatic transmission, a sequential manual transmission, a constant velocity transmission, an electric variable or power sharing transmission or any other suitable transmission. The transmission 124 may be arranged to: drive only a pair of front wheels 111, 112 (i.e. front wheel drive); drive only a pair of rear wheels 113, 114, (i.e. rear wheel drive); or drive all four wheels (i.e. four wheel drive). Embodiments of the disclosure are also suitable for vehicles having less than four wheels or more than four wheels. The vehicle 100 has a battery 150 connected to an inverter 151 that generates a three-phase electrical supply that is supplied to the CIMG 123 when the CIMG 123 is operated in a first mode, as a motor. The battery 150 is arranged to receive charge from the CIMG 123 when the CIMG 123 is operated in a second mode, as a generator. The vehicle 100 has a controller 140 configured to control the vehicle 100 to operate in one of a plurality of modes, including the aforementioned modes.

In addition to the aforementioned ICE, EV and HEV modes, the vehicle 100 may be arranged to operate in one of a parallel charge mode, a coast charge mode, a parallel coast mode and a brake mode. In the parallel charge mode the engine 121 applies a positive or drive torque whilst the CIMG 123 applies a negative or charge torque whereby charge is generated by the CIMG 123 to charge the battery 150, whether the vehicle 100 is stationary or moving. In the coast charge mode the clutch 122 is open, the engine 121 is switched off and the CIMG 123 applies a selectable negative or charge torque whereby charge is generated by the CIMG 123 to charge the battery 150 and the vehicle 100 decelerates. In the parallel coast mode the clutch 122 is open, the engine 121 is switched off and the CIMG 123 applies substantially no torque. In the brake mode, which is typically initiated by the application of a brake pedal, the clutch 122 is open, the engine 121 is switched off and a friction braking mechanism (not shown) is applied, which may be done in conjunction with the CIMG 123 applying a negative or charge torque to charge the battery 150 according to a relationship determined and/or controlled by the controller 140.

Figure 2:
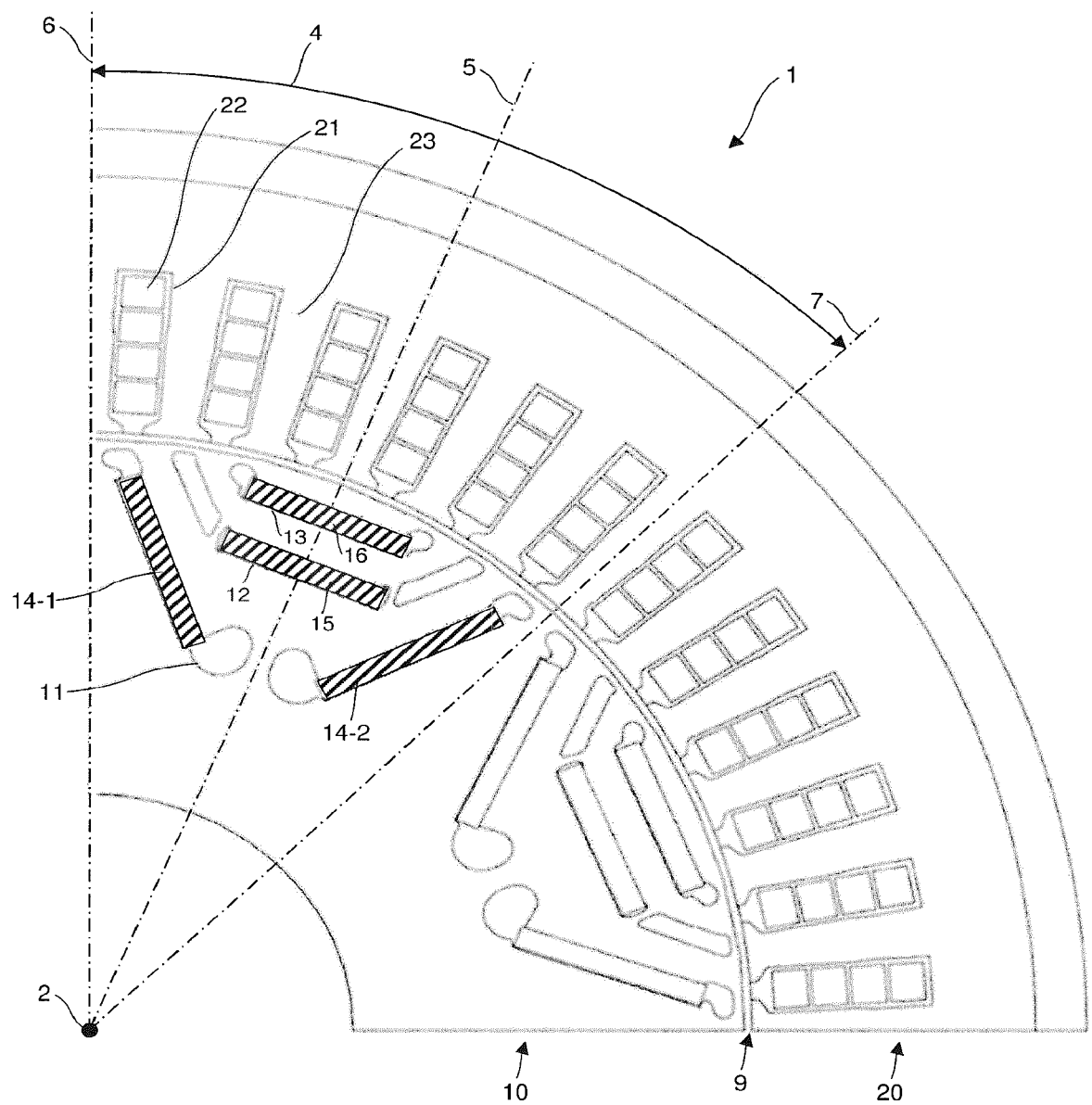
FIG. 2 shows part of an electrical machine according to an embodiment of the present disclosure.
Figure 3:
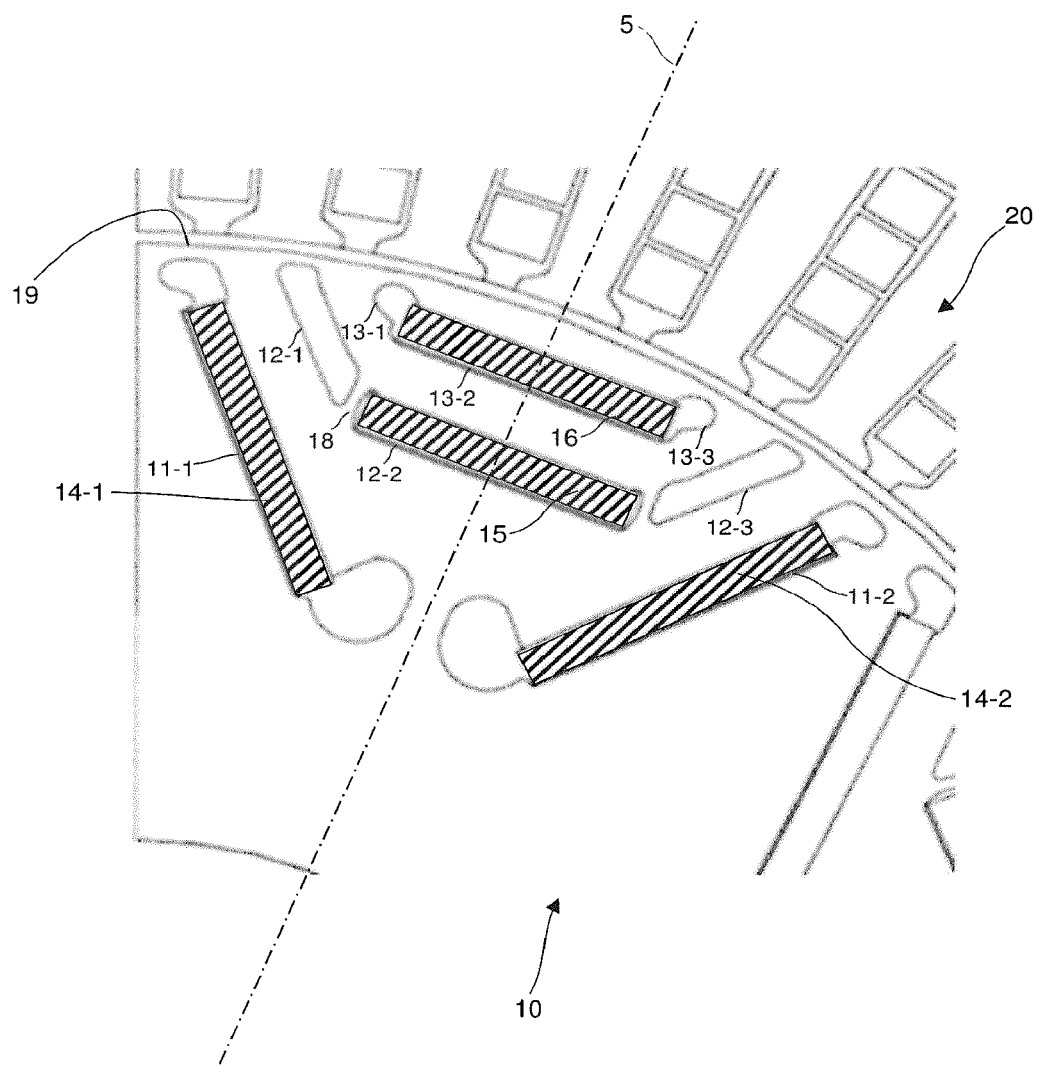
FIG. 3 shows the rotor of the electrical machine of FIG. 2 in more detail.

FIGS. 2 and 3 show a quadrant of a cross-section through an electrical machine 1. The electrical machine 1 may be used in the CIMG 123 shown in FIG. 1. The electrical machine 1 is a permanent magnet synchronous motor (PMSM) comprising a rotor 10 and a stator 20. An air gap 9 is provided between the rotor 10 and the stator 20. FIG. 3 shows a more detailed view of the rotor 10. The rotor 10 is rotatable about an axis of rotation 2. The rotor 10 comprises a plurality of laminations of a ferromagnetic material to form a rotor iron.

Magnets 14-1, 14-2, 15, 16 are embedded in the rotor 10 to form a plurality of rotor poles 4. The magnets 14-1, 14-2, 15, 16 are permanent magnets (PM) and generate a magnetic flux. In this example, the rotor 10 has eight poles. One pole 4 spans the angular range of 45° between radial axes 6, 7. A centre of each pole is represented by a radially-extending axis 5 which passes centrally through the pole. The angular extents of the pole is represented by radial axes 6, 7. The angular extent of each rotor pole 4 (i.e. the included angle between axis 6 and axis 7) is described as the pole step. In this example the pole step is 45°.

The stator 20 comprises a plurality of radial slots 21 distributed around the stator 20. Each slot 21 supports coil windings 22. By energising the coil windings 22 a torque is generated to drive the rotor 10. In this example the electrical machine 1 has forty-eight (48) stator slots 21 and eight (8) rotor poles 4 but it will be understood that the number of poles and/or the number of stator slots can be varied.

The rotor 10 comprises a plurality of cavities, which will be called "slots". In this disclosure a slot configuration can comprise a plurality of slot portions, i.e. a set of slot portions. The slot portions may be continuous, or may be separated by bridge portions of the rotor. The bridge portions help to maintain the structural integrity of the rotor, especially in longer slot configurations.

The slot portions 11, 12, 13 in the rotor are of two different configurations. There is at least one slot of a first configuration and at least one slot of a second configuration. In FIGS. 2 and 3, the slot portions of the first configuration 12, 13 generally form a U-shaped slot configuration and the slot portions of the second configuration 11 generally form a V-shaped slot configuration. In the example shown in FIGS. 2 and 3, the rotor 10 comprises two of the first slot configuration—a first generally U-shaped slot configuration comprising the slot portions 12-1, 12-2, 12-3 and a second generally U-shaped slot configuration comprising the slot portions 13-1, 13-2, 13-3. The slot portions 12-1, 12-2, 12-3 are separated by bridge portions 18 of the rotor. The slot portions 13-1, 13-2, 13-3 are continuous, i.e. there is no bridge which separates them. In the example shown in FIGS. 2 and 3 the rotor 10 comprises one of the second slot configuration—a generally V-shaped slot configuration comprising the slot portions 11-1, 11-2.

Each of the slot configurations 11, 12, 13 is symmetrical about the radial axis 5 of the pole. Each of the U-shaped slot configurations comprises a middle slot portion 12-2, 13-2 which is normal to the radial axis 5 of the pole. A permanent magnet 15, 16, is located within the middle slot portion 12-2, 13-2 of each of the U-shaped slot configurations. The radial axis 5 passes through the magnets 15, 16. The magnets 15, 16 are located symmetrically about the radial axis 5. Each of the U-shaped slot configurations comprises a slot portion 12-1, 13-1 at one end of the first slot portion 12-2, 13-2, and a slot portion 12-3, 13-3 at the other end of the first slot portion 12-2, 13-2 which are not occupied by a magnet. The slot portions 12-1, 13-1, 12-3, 13-3 are at an acute angle to the radial axis 5.

The V-shaped slot configuration comprises a slot portion 11-1 and a slot portion 11-2 which are each at an acute angle to the radial axis 5 of the pole. A first magnet 14-1 is located within the slot portion 11-1 and a second magnet 14-2 is located within the slot portion 11-2. The pair of magnets 14-1, 14-2 is spaced each side of the radial axis 5. The V-shaped slot configuration does not have a magnet located centrally within the slot.

The slot portions of the first slot configuration 12, 13 are located between the slot portions of the second slot configuration 11 and an outer perimeter 19 of the rotor 10. Stated another way, the second configuration 11 embraces the first configuration 12, 13.

It can be seen that the magnets 14, 15 located within the first slot configuration (U-shaped slot configuration) 12, 13 are provided in layers at different depths within the rotor. This helps to increase flux density, which can increase the amount of torque that the machine can deliver. The provision of a second slot configuration (V-shaped slot configuration) which embraces the slot portions of the first slot configuration can further increase flux density, and can also help to shape the distribution of flux across the pole. This can help achieve a more desirable sinusoidal distribution of flux across the pole.

In other embodiments the magnets 14-1, 14-2 can have a length which is a smaller proportion of the distance between the outer circumference 19 of the rotor 10 and the radial axis 5 of the pole. The position of the magnets may be nearer to the outer circumference 19 of the rotor 10, or nearer to the radial axis 5 of the pole, than shown in FIGS. 2 and 3.

In the embodiment shown in FIGS. 2 and 3 there is a single second slot configuration (V-shaped slot configuration) 11. In other embodiments, there can be a plurality of second configuration (V-shaped slots) which are nested on top of each other in a radial direction. For example, there may be a first V-shaped slot configuration 11 as shown in FIGS. 2 and 3, and a second V-shaped slot configuration located radially inwards of the first slot, between the first V-shaped slot 11 and the rotational axis 2 of the rotor.

In the embodiment shown in FIGS. 2 and 3 the magnets 14-1, 14-2 are each located in slot portions 11-1, 11-2 which are of the same length as the magnets. In other embodiments, the magnets 14-1, 14-2 can be shorter than the slot portions 11-1, 11-2 of the slot of the second configuration (V-shaped slot).

Figure 4:
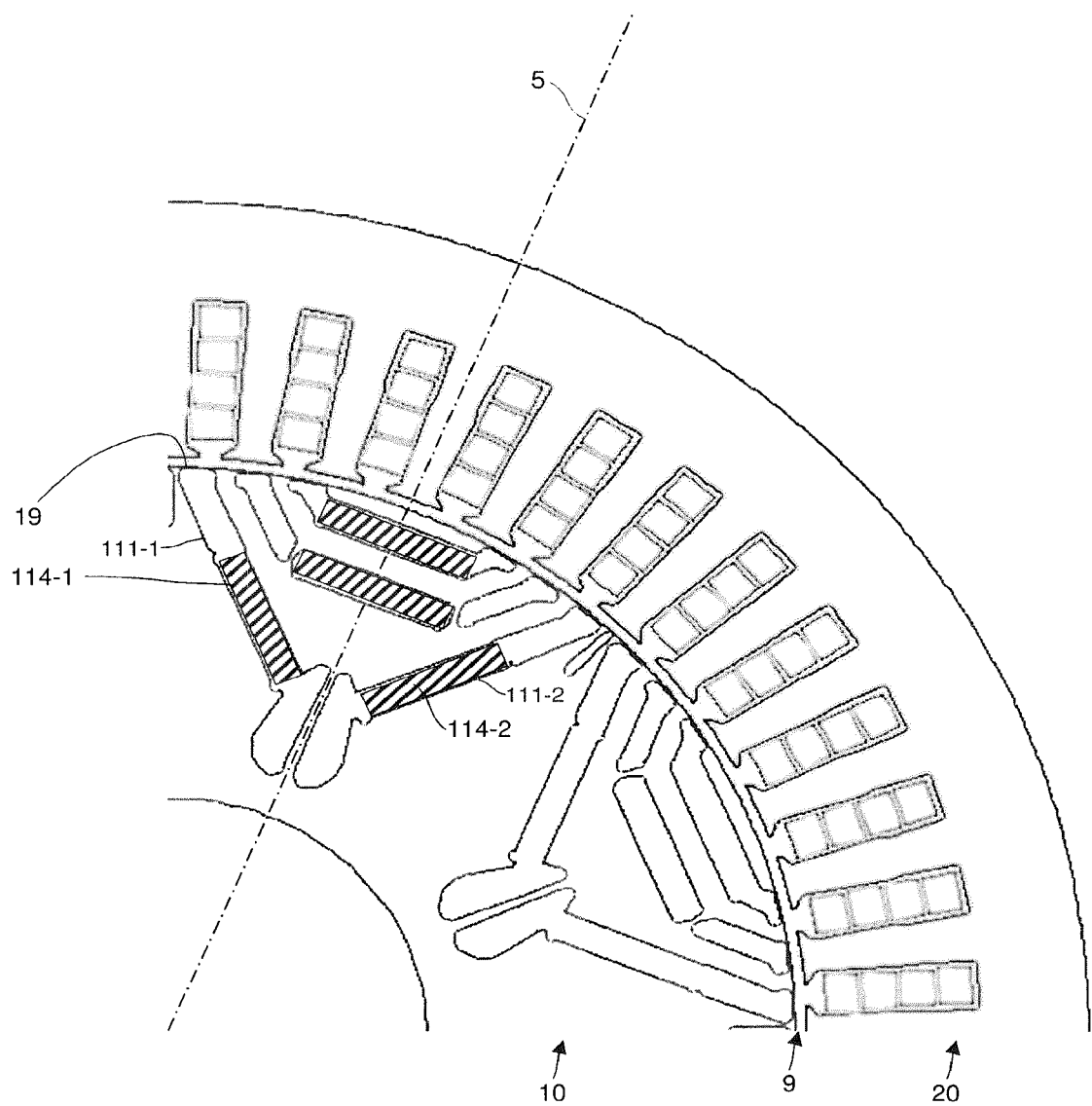
FIG. 4 shows an electrical machine according to an embodiment of the present disclosure.

FIG. 4 shows another embodiment of the electrical machine. The rotor 10 comprises two first configurations and one second slot configuration—a generally V-shaped slot configuration 111 comprising the slot portions 111-1, 111-2. The slot portions 111-1, 111-2 are longer than the magnets 114-1, 114-2 within the slot portions. In this embodiment, the magnets 114-1, 114-2 are located nearer to the radial axis 5 of the pole than to the perimeter 19 of the rotor.

Figure 5:
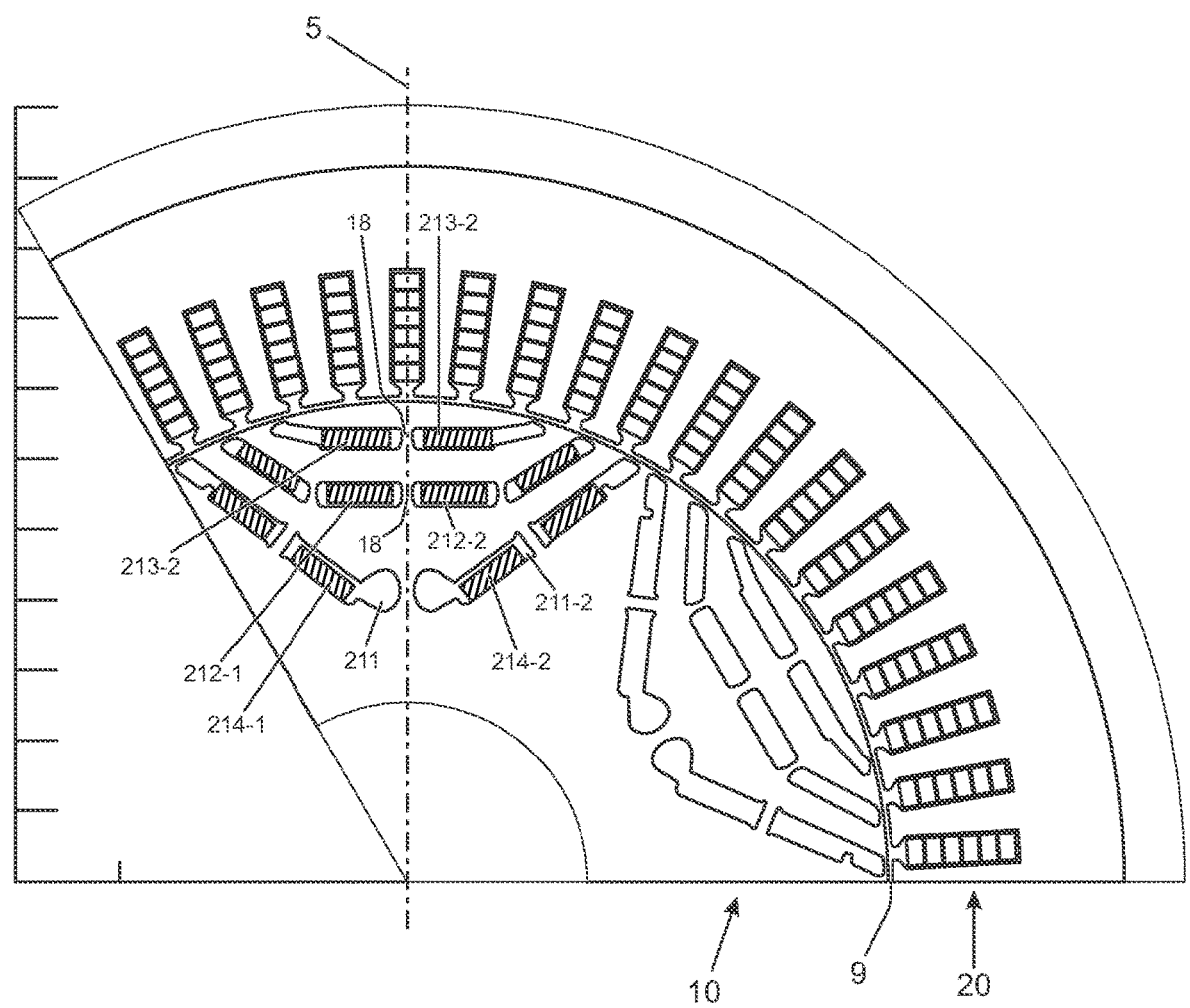
FIG. 5 shows an electrical machine according to an embodiment of the present disclosure.

FIG. 5 shows yet another embodiment of the electrical machine. The rotor 10 comprises two first configurations (U-shaped slot configuration) 212, 213 and one second slot configuration—a generally V-shaped slot configuration 211 comprising the slot portions 211-1, 211-2. As can be seen the slot portions 212-1 and 212-2, and 213-1 and 213-2 forming the first slot configurations 212 and 213 respectively are separated by a bridge portion of the rotor. Each of the slot portions 212-1 and 212-2, and 213-1 and 213-2 have a magnet within them.

Figure 6:
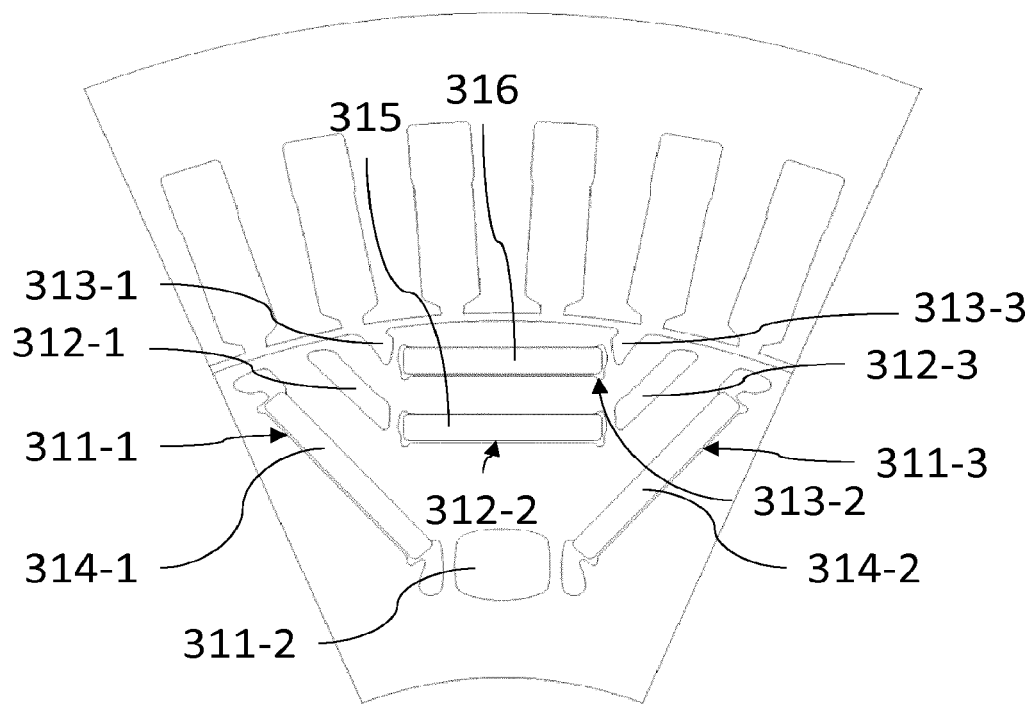
FIG. 6 shows an electrical machine according to an embodiment of the present disclosure.

FIG. 6 shows yet another embodiment of the electrical machine. The rotor comprises two first configurations (U-shaped slot configuration) 312, 313 and one second slot configuration 311. Unlike with the previous embodiments, the second slot configuration 311, while still a generally V-shaped slot configuration, comprises an air pocket 311-2 in the centre of the V shape, in addition to the two slot portions 311-1, 311-3. The slot portions 311-1 and 311-3 contain magnets 314-1 and 314-2. The first configuration 312 comprises slot portions 312-1, 312-2 and 312-3. The slot portion 312-2 contains a magnet 315. The first configuration 313 comprises slot portions 313-1, 313-2 and 313-3. The slot portion 313-2 contains a magnet 316. The slot portions 313-1 and 313-3 are open to the outside of the rotor.

Figure 7:
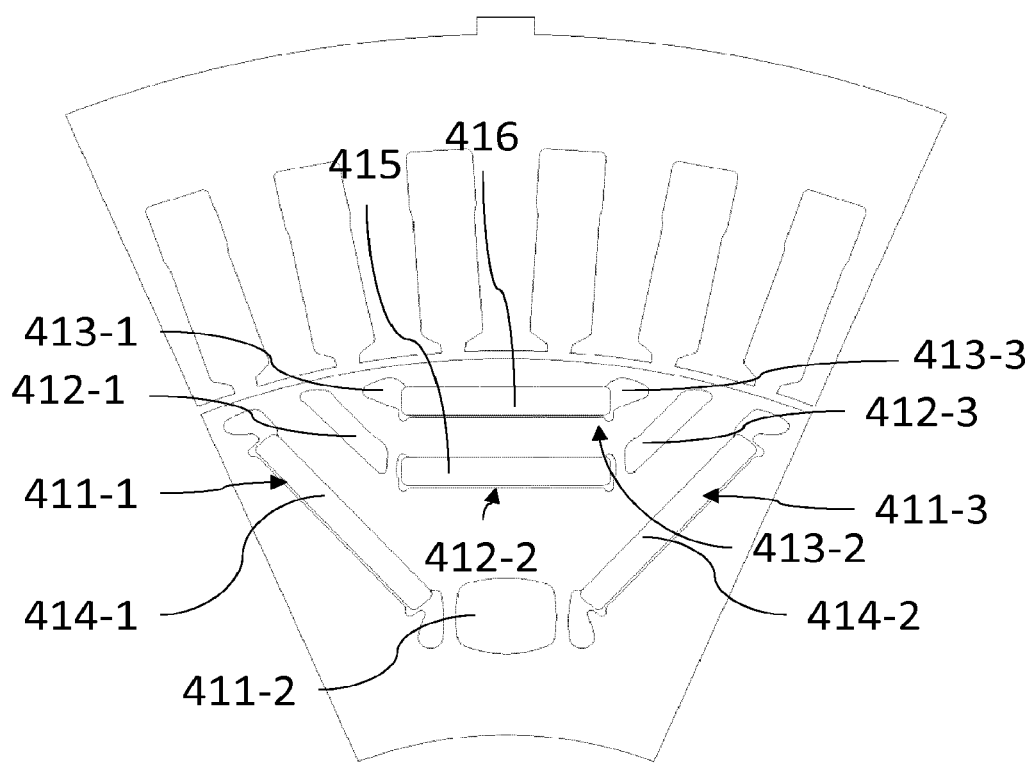
FIG. 7 shows an electrical machine according to an embodiment of the present disclosure.

FIG. 7 shows yet another embodiment of the electrical machine. The rotor comprises two first configurations (U-shaped slot configuration) 412, 413 and one second slot configuration 411. As with the embodiment of FIG. 6, the second slot configuration 411 comprises an air pocket 411-2 in the centre of the V shape, in addition to the two slot portions 411-1, 411-3. The slot portions 411-1 and 411-3 contain magnets 414-1 and 414-2. The first configuration 412 comprises slot portions 412-1, 412-2 and 412-3. The slot portion 412-2 contains a magnet 415. The first configuration 413 comprises slot portions 313-1, 313-2 and 413-3. The slot portion 413-2 contains a magnet 416. Unlike the embodiment of FIG. 6, the slot portions 413-1 and 413-3 are not open to the outside of the rotor.

The outermost slot configuration (closest to the outside of the rotor) may in an extreme case simply comprise a flat magnet within a slot, without the side air gaps. This provides the freedom to reduce the reluctance path (the iron in front of the magnet towards the outer rotor) and reduce the saliency, which can be beneficial to increase the power from the magnet, but can create problems such as demagnetization of that magnet which is closer to the outside of the rotor as well as losing reluctance torque.

It will be understood that any other similar distribution of magnets within the slot portions may be conceived provided that the magnets are placed symmetrically about the radial axis of the pole.

Throughout the description of this specification, the words "comprise" and "contain" and variations of the words, for example "comprising" and "comprises", means "including but not limited to", and is not intended to (and does not) exclude other moieties, additives, components, integers or steps.

Throughout the description of this specification, the singular encompasses the plural unless the context otherwise requires. For instance, where the indefinite article is used, the specification is to be understood as contemplating plurality as well as singularity, unless the context requires otherwise.

Features, integers, characteristics, compounds, chemical moieties or groups described in conjunction with an aspect, embodiment or example of the disclosure are to be understood to be applicable to any other aspect, embodiment or example described herein unless incompatible therewith.

The invention claimed is:

1. A rotor for an electrical machine having a plurality of poles, wherein each of the plurality of poles comprises a radial axis centrally through the pole, each of the plurality of poles further comprising:
   a first slot configuration having a magnet, the magnet being substantially perpendicular to the radial axis; and
   a second slot configuration having a pair of magnets located at spaced apart positions within the second slot configuration, the pair of magnets located each side of the radial axis and at an acute angle to the radial axis to form a generally V-shaped second slot configuration,
   wherein the first slot configuration is located between the second slot configuration and an outer perimeter of the rotor,
   wherein each of the plurality of poles further comprises two first slot configurations, an inner one of the two first slot configurations comprising a first slot portion which is perpendicular to the radial axis, with the magnet located within the first slot portion, a third slot portion and a fourth slot portion,
   wherein the third slot portion and the fourth slot portion are at opposite ends of the first slot portion, and the third slot portion and the fourth slot portion are at an acute angle to the radial axis, and
   wherein an outer one of the two first slot configurations comprises a first slot portion but not a third slot portion or a fourth slot portion.

2. The rotor according to claim 1, wherein the first slot configuration comprises a first slot portion and a second slot portion which are located each side of and perpendicular to the radial axis, with both the first and second slot portions having a magnet.

3. The rotor according to claim 2, wherein, for the first slot configuration, the first slot portion and the second slot portion are separated by a bridge.

4. The rotor according to claim 1, wherein, for the first slot configuration, the third slot portion and the fourth slot portion are separated from a first slot portion by a bridge.

5. The rotor according to claim 1, wherein the first slot configuration comprises a first slot portion and a second slot portion which are located each side of and perpendicular to the radial axis, with both the first and second slot portions having a magnet, and wherein, for the first slot configuration, the third slot portion and the fourth slot portion are continuous with the first slot portion and second slot portion, respectively.

6. The rotor according to claim 1, wherein, for the first slot configuration, the third slot portion and the fourth slot portion are continuous with a first slot portion.

7. The rotor according to claim 1, wherein each of the plurality of poles further comprises:
   two first slot configurations; and
   a single second slot configuration,
   wherein the two first slot configurations are located between the single second slot configuration and the outer perimeter of the rotor.

8. The rotor according to claim 1, wherein the magnet in the first slot configuration and the pair of magnets in the second slot configuration are of equal length.

9. The rotor according to claim 1, wherein the first slot configuration is a generally U-shaped slot configuration.

10. The rotor according to claim 1, wherein the third and fourth slot portions are open to outside the rotor.

11. The rotor according to claim 1, wherein the second slot configuration comprises a central slot portion through which a central axis of the pole passes.

12. An electrical machine including the rotor according to claim 1.

13. A motor vehicle comprising the electrical machine according to claim 12.

14. A rotor for an electrical machine having a plurality of poles, wherein each of the plurality of poles comprises a radial axis centrally through the pole, each of the plurality of poles further comprising:
   a first slot configuration having a magnet, the magnet being located centrally within the slot configuration with the radial axis passing through the magnet; and
   a second slot configuration having a pair of magnets located at spaced apart positions within the second slot configuration, the pair of magnets located each side of the radial axis and at an acute angle to the radial axis to form a generally V-shaped second slot configuration,
   wherein the first slot configuration is located between the second slot configuration and an outer perimeter of the rotor,
   within the fifth slot portion is shorter than a length of the fifth slot portion wherein each of the plurality of poles further comprises two first slot configurations, an inner one of the two first slot configurations comprising a first slot portion which is perpendicular to the radial axis, with the magnet located within the first slot portion, a third slot portion and a fourth slot portion,
   wherein the third slot portion and the fourth slot portion are at opposite ends of the first slot portion, and the third slot portion and the fourth slot portion are at an acute angle to the radial axis, and
   wherein an outer one of the two first slot configurations comprises a first slot portion but not a third slot portion or a fourth slot portion.

* * * * *